United States Patent
Tanaka et al.

(10) Patent No.: US 9,587,376 B1
(45) Date of Patent: Mar. 7, 2017

(54) DRAINAGE STRUCTURE FOR A WORK VEHICLE

(71) Applicant: KOMATSU LTD., Tokyo (JP)

(72) Inventors: Yutaka Tanaka, Komatsu (JP); Takeshi Kamimae, Kanazawa (JP); Ken Nishihara, Komatsu (JP); Yasufumi Ohchi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/889,530

(22) PCT Filed: Sep. 14, 2015

(86) PCT No.: PCT/JP2015/075977
§ 371 (c)(1),
(2) Date: Nov. 6, 2015

(87) PCT Pub. No.: WO2016/024641
PCT Pub. Date: Feb. 18, 2016

(51) Int. Cl.
*B62D 49/00* (2006.01)
*E02F 9/08* (2006.01)
(Continued)

(52) U.S. Cl.
CPC ............ *E02F 9/0866* (2013.01); *B60K 11/04* (2013.01); *B62D 25/24* (2013.01); *E02F 9/0891* (2013.01); *B62D 49/00* (2013.01); *E02F 3/34* (2013.01)

(58) Field of Classification Search
CPC ...... E02F 9/0866; E02F 9/0891; B62D 25/24; B60K 11/04
See application file for complete search history.

(56) References Cited

U.S. PATENT DOCUMENTS

| 8,181,728 B2 * | 5/2012 | Hartland | B60K 11/08 180/68.1 |
| 2007/0007061 A1 * | 1/2007 | Meyer | B60K 11/04 180/68.1 |
| 2014/0238767 A1 | 8/2014 | Numa | |

FOREIGN PATENT DOCUMENTS

| EP | 2 792 795 A1 | 10/2014 |
| EP | 2 918 437 A1 | 9/2015 |

(Continued)

OTHER PUBLICATIONS

The International Search Report for the corresponding international application No. PCT/JP2015/075977, issued on Nov. 17, 2015.
(Continued)

*Primary Examiner* — John Walters
*Assistant Examiner* — James Triggs
(74) *Attorney, Agent, or Firm* — Global IP Counselors, LLP (57) ABSTRACT

An engine compartment accommodates an engine. A cooling device is configured to cool the engine. A cooling compartment accommodates the cooling device. A division wall is disposed between the engine compartment and the cooling compartment. A ventilation portion includes a hole for permitting air to pass therethrough and is provided on a top surface of the engine compartment. A water receiving member is disposed under the ventilation portion within the engine compartment. A water catchment member is disposed in the cooling compartment and catches water received by the water receiving member. A drainage pathway is connected to the water catchment member and leads the water to a predetermined drainage position.

16 Claims, 9 Drawing Sheets

(51) Int. Cl.
*B60K 11/04* (2006.01)
*B62D 25/24* (2006.01)
*E02F 3/34* (2006.01)

(56) References Cited

FOREIGN PATENT DOCUMENTS

| FR | 2 922 855 A1 | 5/2009 |
| JP | 59-156854 U | 10/1984 |
| JP | 2001-253301 A | 9/2001 |
| WO | 2015/079749 A1 | 6/2015 |
| WO | 2016/024641 A1 | 2/2016 |

OTHER PUBLICATIONS

The European search report for the corresponding European application No. 15188420.2 issued on Mar. 31, 2016.

* cited by examiner

DRAINAGE STRUCTURE FOR A WORK VEHICLE

CROSS-REFERENCE TO RELATED APPLICATIONS

This application is a U.S. National stage application of International Application No. PCT/JP2015/075977, filed on Sep. 14, 2015.

BACKGROUND

Field of the Invention

The present invention relates to a work vehicle.

Background Information

A work vehicle includes an engine compartment for accommodating an engine and a cooling compartment for accommodating a cooling device, such as a radiator. For example, in a work vehicle described in International Patent Application Publication No. WO2015/079749, the top surface of the engine compartment is provided with a ventilation portion having holes to allow air to pass therethrough. Additionally, a water receiving member is disposed under the ventilation portion. Water, such as rainwater, is received by the water receiving member when passing through the holes of the ventilation portion. With the construction, it is possible to enhance a cooling effect within the engine compartment and also inhibit the engine disposed in the engine compartment from being exposed to the water passing through the ventilation portion.

The water receiving member is connected to a discharge portion disposed in the upper region of the cooling compartment. The water received by the water receiving member flows to the discharge portion, and is then discharged therefrom to the cooling compartment. The cooling compartment is constructed to make external air easily pass therethrough to lead cooling air to the cooling device. Therefore, the cooling compartment is constructed to permit water intrusion. Consequently, by discharging water to the cooling compartment as described above, the water can be discharged to the outside of a vehicle through the cooling compartment.

SUMMARY

Technical Problems

In International Patent Application Publication No. WO2015/079749, the end of the discharge portion has a flat plate shape. Therefore, water inevitably flows down into the cooling compartment from any position on the end of the discharge portion. Consequently, when a large amount of water is received by the water receiving member, the received water is supposed to massively flow down into the cooling compartment from all over the end of the discharge portion.

The engine compartment and the cooling compartment are divided, as described above, through a division wall. However, the division wall does not completely seal the engine compartment, and a clearance exists in the division wall whereby the engine compartment and the cooling compartment communicate with each other. For example, in some constructions, the division wall does not reach the lower end of the engine compartment, and thus, the engine compartment and the cooling compartment communicate with each other under the division wall. With the construction, when a large amount of water flows into the cooling compartment from the end of the discharge portion, water intrudes into the engine compartment through the clearance, and machines disposed in the engine compartment could be exposed to the water.

It is an object of the present invention to provide a work vehicle whereby even when a large amount of water is received by a water receiving member disposed in an engine compartment, machines disposed in the engine compartment can be inhibited from being exposed to the water.

A work vehicle according to an aspect of the present invention includes an engine, an engine compartment, a cooling device, a cooling compartment, a division wall, a ventilation portion, a water receiving member, a water catchment member and a drainage pathway. The engine compartment accommodates the engine. The cooling device is configured to cool the engine. The cooling compartment accommodates the cooling device. The division wall is disposed between the engine compartment and the cooling compartment. The ventilation portion includes a hole for permitting air to pass therethrough and is provided on a top surface of the engine compartment. The water receiving member is disposed under the ventilation portion within the engine compartment. The water catchment member is disposed in the cooling compartment and catches water received by the water receiving member. The drainage pathway is connected to the water catchment member and leads the water to a predetermined drainage position.

In the work vehicle according to the present aspect, the water received by the water receiving member is caught by the water catchment member in the cooling compartment. Then, the water is led from the water catchment member to the predetermined drainage position through the drainage pathway. With this construction, the water can be led to the predetermined drainage position without being allowed to easily intrude into the engine compartment. Accordingly, even when a large amount of water is received by the water receiving member disposed in the engine compartment, machines disposed in the engine compartment can be inhibited from being exposed to the water.

According to the present invention, it is possible to provide a work vehicle that even when a large amount of water is received by a water receiving member disposed in the engine compartment, machines disposed in the engine compartment can be inhibited from being exposed to the water.

DETAILED DESCRIPTION OF EXEMPLARY EMBODIMENTS

Figure 1:
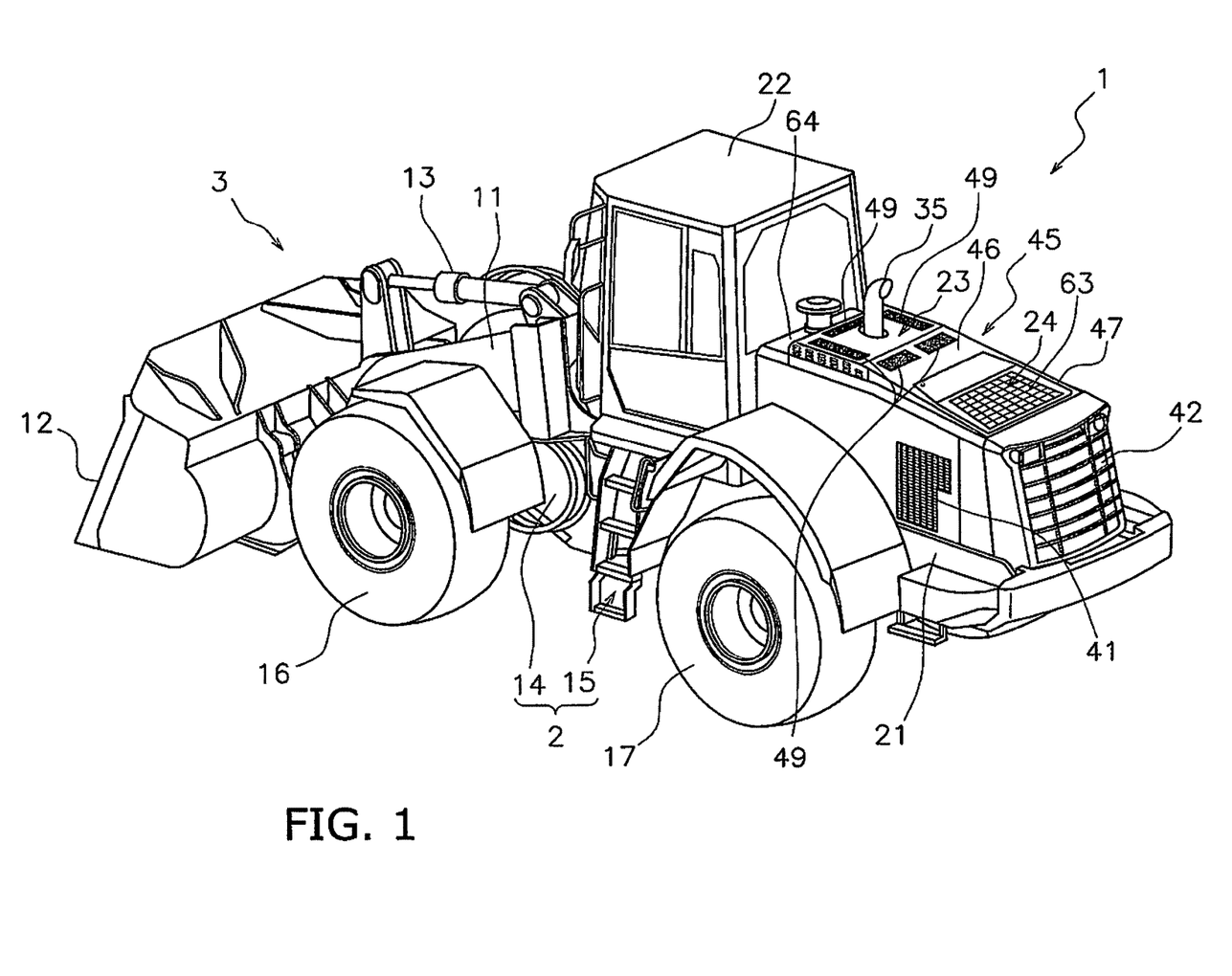
FIG. 1 is a perspective view of a work vehicle according to an exemplary embodiment.

A work vehicle according to an exemplary embodiment will be hereinafter explained with drawings. FIG. 1 is a perspective view of a work vehicle 1 according to the exemplary embodiment. The work vehicle 1 according to the exemplary embodiment is a wheel loader. It should be noted that in the following explanation, the terms "right", "left", "up" and "down" indicate directions defined based on a view from an operator seated in the wheel loader. The term "vehicle width direction" is used synonymously with the term "right and left direction".

The work vehicle 1 includes a vehicle body 2 and a work implement 3. The work implement 3 includes a boom 11 and a bucket 12. The boom 11 is rotatably attached to the vehicle body 2. The boom 11 is configured to be driven by a lift cylinder (not shown in the drawings). The bucket 12 is rotatably attached to the tip of the boom 11. The bucket 12 is configured to be rotated up and down by a bucket cylinder 13.

The vehicle body 2 includes a front body 14 and a rear body 15. The front body 14 and the rear body 15 are coupled to each other and are pivotable in the right-and-left direction. The work implement 3 and front wheels 16 are attached to the front body 14. Rear wheels 17 are attached to the rear body 15.

The rear body 15 includes a vehicle body frame 21, a cab 22, an engine compartment 23 and a cooling compartment 24. The vehicle body frame 21 supports the rear wheels 17. The cab 22 is disposed on the vehicle body frame 21. The engine compartment 23 is disposed rearward of the cab 22. The cooling compartment 24 is disposed rearward of the engine compartment 23. An air cleaner 25 is disposed between the engine compartment 23 and the cab 22.

Figure 2:
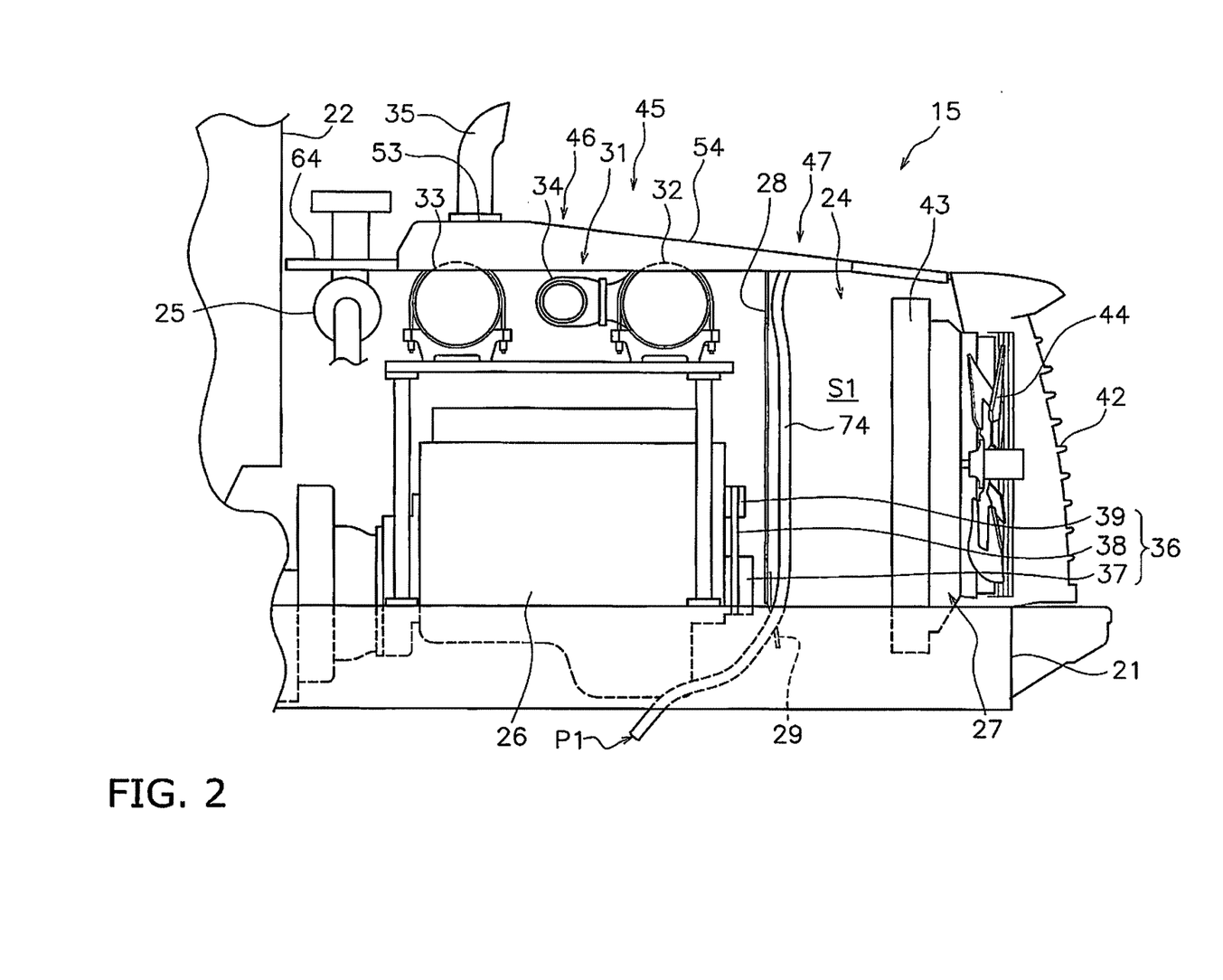
FIG. 2 is a cross-sectional side view of a rear body.

FIG. 2 is a cross-sectional side view of the rear body 15. As shown in FIG. 2, an engine 26 is accommodated in the engine compartment 23. A cooling device 27 for cooling the engine 26 is disposed in the cooling compartment 24. A division wall 28 is disposed between the engine compartment 23 and the cooling compartment 24, and divides between the engine compartment 23 and the cooling compartment 24. The division wall 28 is supported by the vehicle body frame 21, and upwardly extends from the upper surface of the vehicle body frame 21. The height of the lower end of the division wall 28 is roughly the same as that of the upper surface of the vehicle body frame 21. Therefore, the division wall 28 does not exist under the upper surface of the vehicle body frame 21. In other words, the engine compartment 23 and the cooling compartment 24 communicate under the upper surface of the vehicle body frame 21. It should be noted that a protection member 29 is attached to the division wall 28. The protection member 29 downwardly protrudes from the lower end of the division wall 28.

An exhaust gas processing device 31 is disposed over the engine 26 in the engine compartment 23. The exhaust gas processing device 31 includes a first processing device 32 and a second processing device 33. The first processing device 32 is, for instance, a diesel particulate trap filter device. The second processing device 33 is, for instance, a selective catalytic reduction device. The first processing device 32 is connected to an exhaust port of the engine 26 through a connecting pipe (not shown in the drawings). The second processing device 33 is connected to the first processing device 32 through a relay pipe 34. An exhaust pipe 35 is connected to the second processing device 33.

An engine auxiliary machine 36 is attached to the engine 26. The engine auxiliary machine 36 is disposed on the cooling compartment 24 side of the engine 26. The engine auxiliary machine 36 is disposed between the engine 26 and the division wall 28 in the vehicle back-and-forth direction. The engine auxiliary machine 36 includes a pulley 37, a belt 38 and an alternator 39. The pulley 37 and the alternator 39 are attached to the engine 26. The belt 38 is wound over the pulley 37 and the alternator 39. The belt 38 is at least partially located under the lower end of the division wall 28. The belt 38 is at least partially located under the upper surface of the vehicle body frame 21. The pulley 37 is at least partially located under the lower end of the division wall 28. The pulley 37 is at least partially located under the upper surface of the vehicle body frame 21.

In the cooling compartment 24, the cooling device 27 is disposed away from the division wall 28 through a ventilation space S1. As shown in FIG. 1, the lateral surface of the cooling compartment 24 is provided with a ventilation portion 41. The ventilation portion 41 includes a plurality of ventilation holes. The rear surface of the cooling compartment 24 is provided with a grill portion 42. The grill portion 42 includes a plurality of ventilation holes. The grill portion 42 is disposed rearward of the cooling device 27. The cooling device 27 includes a radiator 43 and a cooling fan 44.

The radiator 43 is configured to cool cooling water of the engine 26. The cooling fan 44 is disposed rearward of the radiator 43. The cooling fan 44 is configured to be rotated to discharge the air in the cooling compartment 24 to the outside of the cooling compartment 24. When described in detail, the cooling fan 44 is configured to be rotated so as to discharge the air in the cooling compartment 24 to the outside of the cooling compartment 24 through the grill portion 42.

Figure 3:
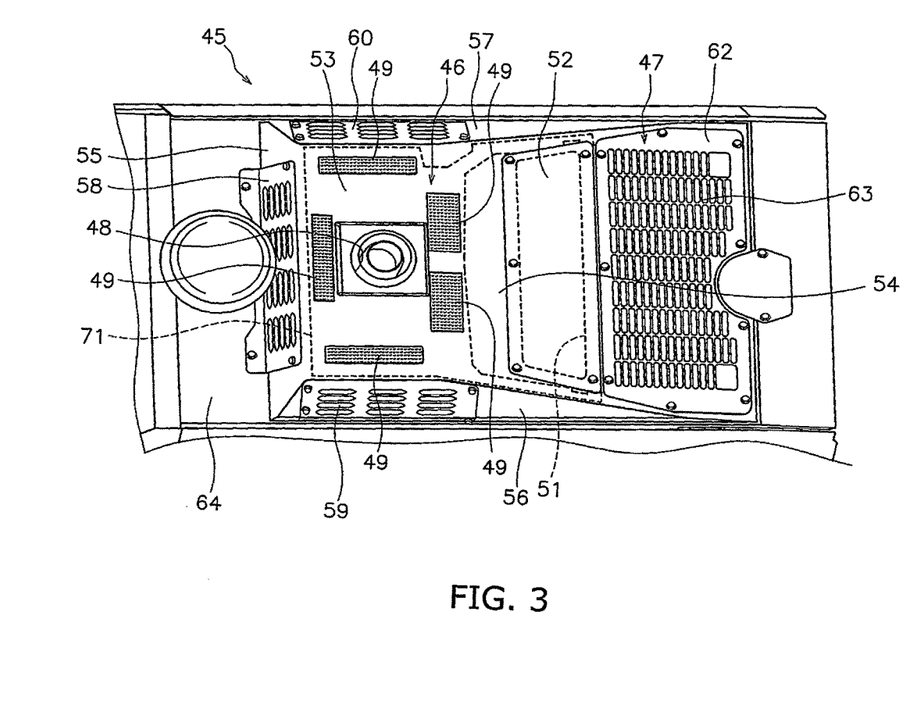
FIG. 3 is a top view of the rear body.

FIG. 3 is a top view of the rear body 15. As shown in FIGS. 2 and 3, the rear body 15 includes a ceiling unit 45. The ceiling unit 45 defines the top surface of the engine compartment 23 and that of the cooling compartment 24. The ceiling unit 45 includes a first top surface 46 and a second top surface 47. The first top surface 46 is located over the engine compartment 23. The second top surface 47 is located over the cooling compartment 24.

The first top surface 46 includes a first opening 48. The aforementioned exhaust pipe 35 upwardly protrudes through the first opening 48. The first top surface 46 includes a plurality of first ventilation portions 49. Each of the first ventilation portions 49 includes a plurality of holes to allow air to pass therethrough. The first ventilation portions 49 are disposed in the surroundings of the first opening 48. In the present exemplary embodiment, the first ventilation portions 49 are respectively disposed forward, rearward, right and left of the first opening 48. The first ventilation portions 49 are located over the engine 26. Additionally, the first ventilation portions 49 are located over the exhaust gas processing device 31. When described in detail, the first ventilation portions 49 are located over the second processing device 33.

Figure 4:
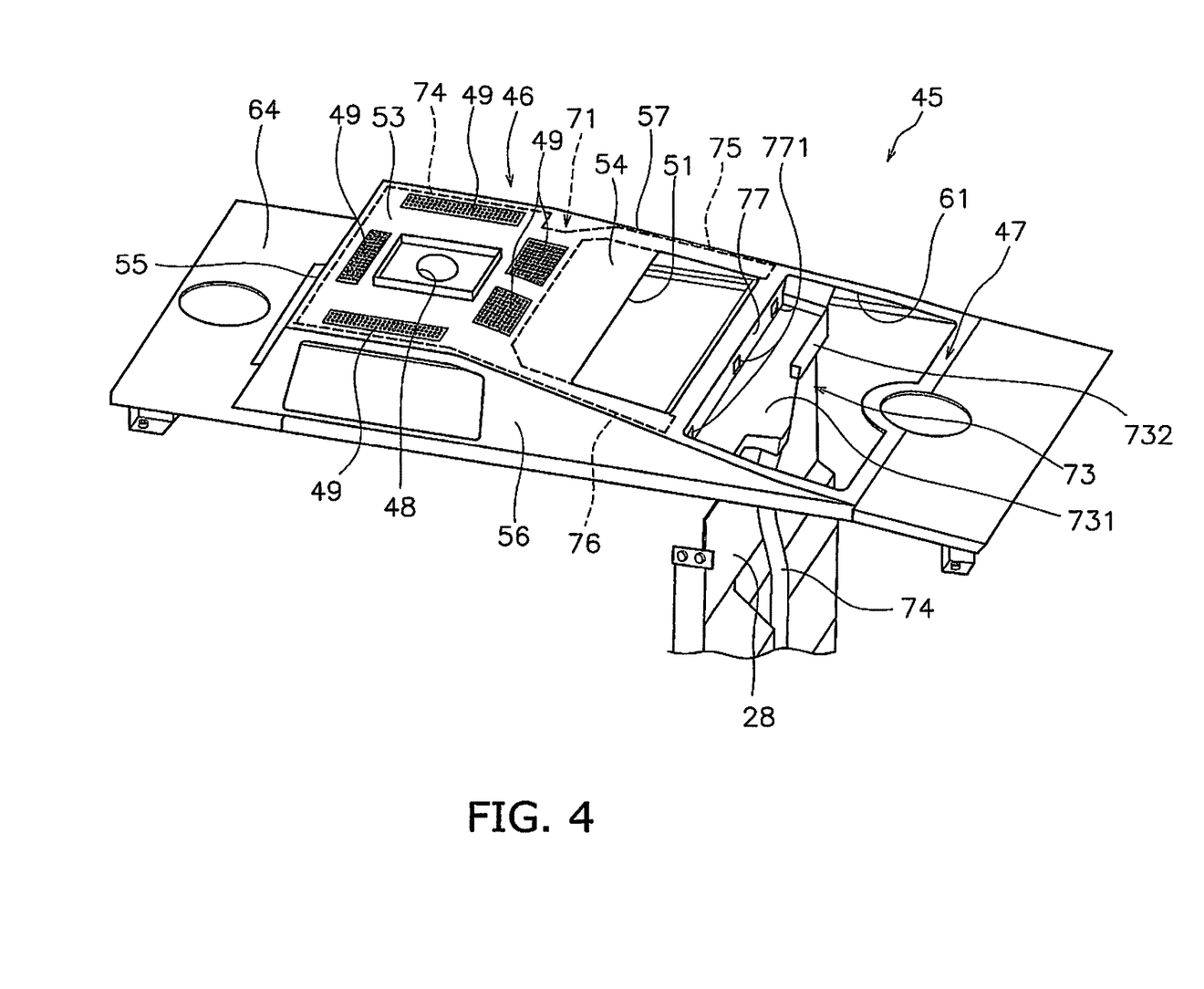
FIG. 4 is a perspective view of a ceiling unit and a division wall.

FIG. 4 is a perspective view of the ceiling unit 45 and the division wall 28. It should be noted that FIG. 4 shows a condition that the ceiling unit 45 is not provided with cover members to be attached thereto. As shown in FIG. 4, the first top surface 46 includes a second opening 51. The second opening 51 is disposed over the first processing device 32. The second opening 51 has an opening area larger than that of the first opening 48 in a top view. As shown in FIG. 3, the second opening 51 is covered with a first cover member 52 to be attached to the first top surface 46.

The first top surface 46 includes a flat part 53 and a tilt part 54. The flat part 53 is located over the second processing device 33. The tilt part 54 is located rearward of the flat part 53. The tilt part 54 is located over the first processing device 32. The flat part 53 is arranged roughly in parallel to the horizontal direction. The tilt part 54 obliquely tilts down to the rear. The flat part 53 includes the aforementioned first opening 48 and first ventilation portions 49. The tilt part 54 includes the aforementioned second opening 51.

The ceiling unit 45 includes a front surface 55, a left side surface 56 and a right side surface 57. The front surface 55 is connected to the front edge of the first top surface 46. The left side surface 56 is connected to the left side edge of the first top surface 46. The right side surface 57 is connected to the right side edge of the first top surface 46. The front surface 55, the left side surface 56 and the right side surface 57 respectively include openings, and the openings are respectively covered with a front cover member 58, a left cover member 59 and a right cover member 60. The front cover member 58, the left cover member 59 and the right cover member 60 respectively include ventilation holes. The respective ventilation holes are respectively provided with hoods to block intrusion of water from above.

The second top surface 47 includes a third opening 61. The third opening 61 is located over the cooling compartment 24. When described in detail, the third opening 61 is located over the ventilation space S1. In a top view, the third opening 61 has an opening area larger than that of the second opening 51. The third opening 61 is covered with a second cover member 62 to be attached to the second top surface 47. The second cover member 62 includes a second ventilation portion 63. The second ventilation portion 63 includes a plurality of ventilation holes.

The ceiling unit 45 includes a third top surface 64. The third top surface 64 is disposed over the aforementioned air cleaner 25. The third top surface 64 is disposed forward of the first top surface 46. The third top surface 64 is connected to the lower edge of the front surface 55. The third top surface 64 is located lower than the first top surface 46.

In the work vehicle 1 according to the present exemplary embodiment, the external air is configured to be taken into the cooling compartment 24 when the cooling fan 44 is driven. The external air is sucked into the cooling compartment 24 through the ventilation portion 41 of the lateral surface of the cooling compartment 24 and the second ventilation portion 63 of the second top surface 47. The air sucked into the cooling compartment 24 flows through the radiator 43 and is then discharged to the outside through the grill portion 42. Accordingly, the cooling water of the engine 26 is cooled by the radiator 43.

The external air is also sucked into the engine compartment 23 through the first ventilation portions 49 of the first top surface 46. The air sucked into the engine compartment 23 flows through the cooling compartment 24 and is then discharged to the outside through the grill portion 42. Accordingly, the engine 26, the exhaust gas processing device 31 and the engine auxiliary machine 36 are cooled within the engine compartment 23.

It should be noted that the first top surface 46 is provided with the first ventilation portions 49, and hence, it is inevitable that water, such as rainwater, easily intrudes into the space inside the first top surface 46 through the first ventilation portions 49. In view of this, the work vehicle 1 according to the present exemplary embodiment is provided with a drainage structure for discharging, to the outside of the vehicle, water that has intruded into the interior through the first ventilation portions 49. The drainage structure will be hereinafter explained in detail.

Figure 5:
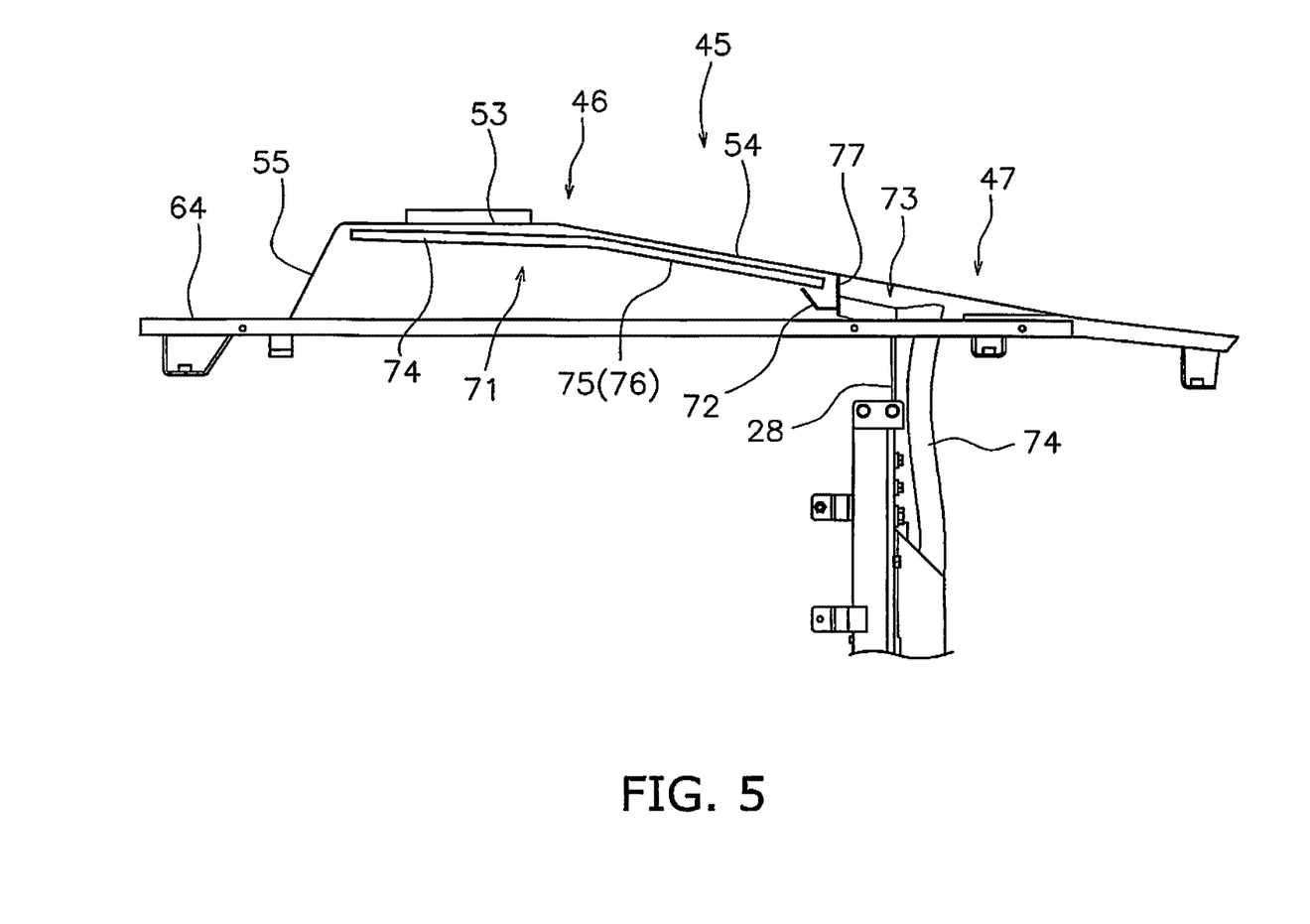
FIG. 5 is a side view of a construction of a drainage structure.
Figure 6:
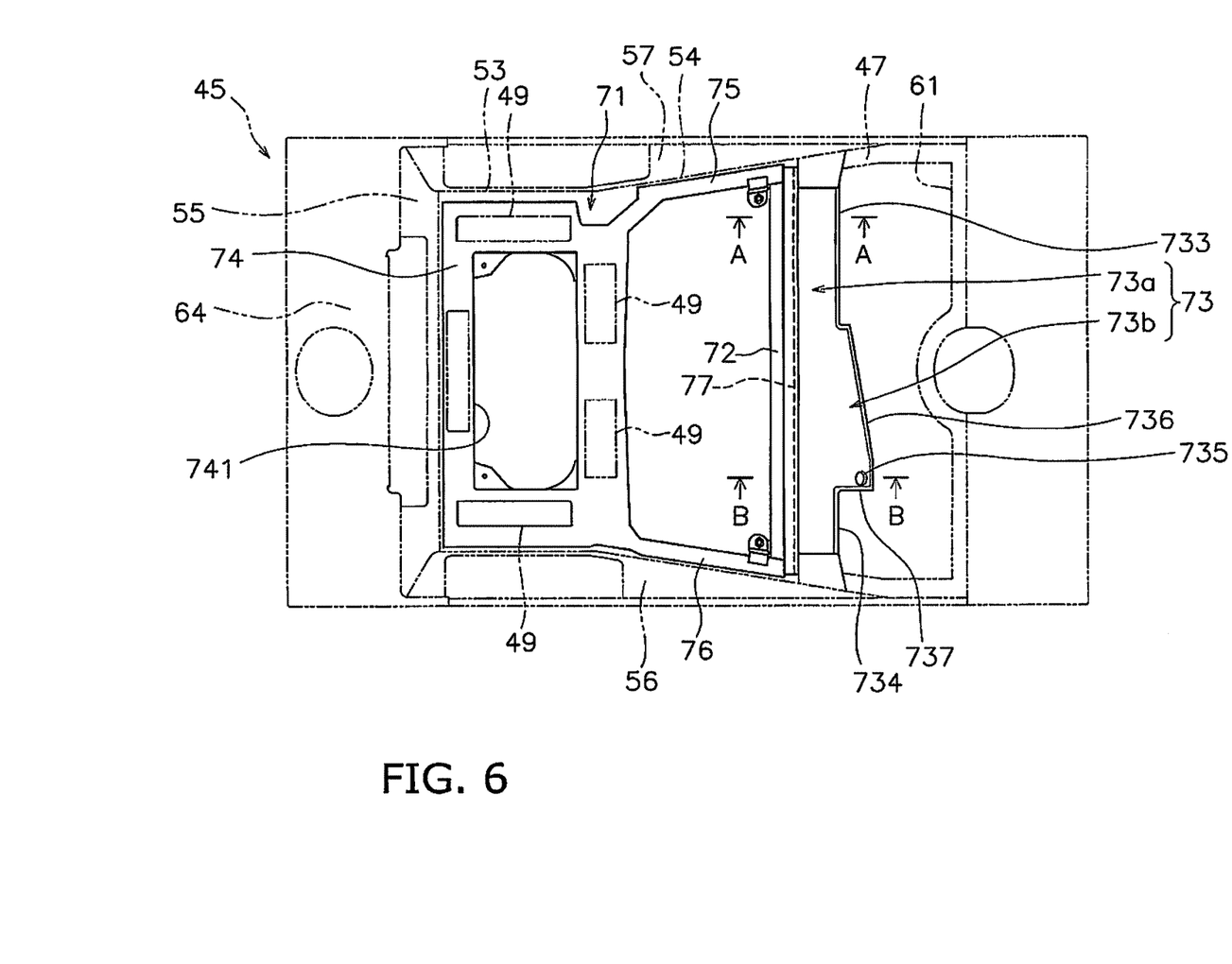
FIG. 6 is a top view of the construction of the drainage structure.

FIG. 5 is a side view of a construction of the drainage structure. FIG. 6 is a top view of the construction of the drainage structure. It should be noted that in FIG. 6, the shape of the ceiling unit 45 is depicted with dashed two-dotted lines. As shown in FIGS. 5 and 6, the work vehicle 1 includes a water receiving member 71, a first water catchment member 72, a second water catchment member 73 and a drainage pathway 74. The water receiving member 71 and the first water catchment member 72 are disposed in the engine compartment 23. The second water catchment member 73 is disposed in the cooling compartment 24. The first water catchment member 72 and the second water catchment member 73 catch water received by the water receiving member 71. The drainage pathway 74 is connected to the second water catchment member 73 and leads water to a predetermined drainage position.

The water receiving member 71 is disposed under the first top surface 46. The water receiving member 71 is disposed higher than the division wall 28. As shown in FIGS. 3 and 4, the water receiving member 71 is disposed under the first ventilation portions 49 within the engine compartment 23. The water receiving member 71 is faced to the lower side of the first top surface 46. The water receiving member 71 is disposed higher than the engine 26 and the exhaust gas processing device 31. The water receiving member 71 receives water dripping through the first ventilation portions 49. Accordingly, the engine 26, the exhaust gas processing device 31 and the engine auxiliary machine 36 can be inhibited from being exposed to water within the engine compartment 23.

Figure 7:
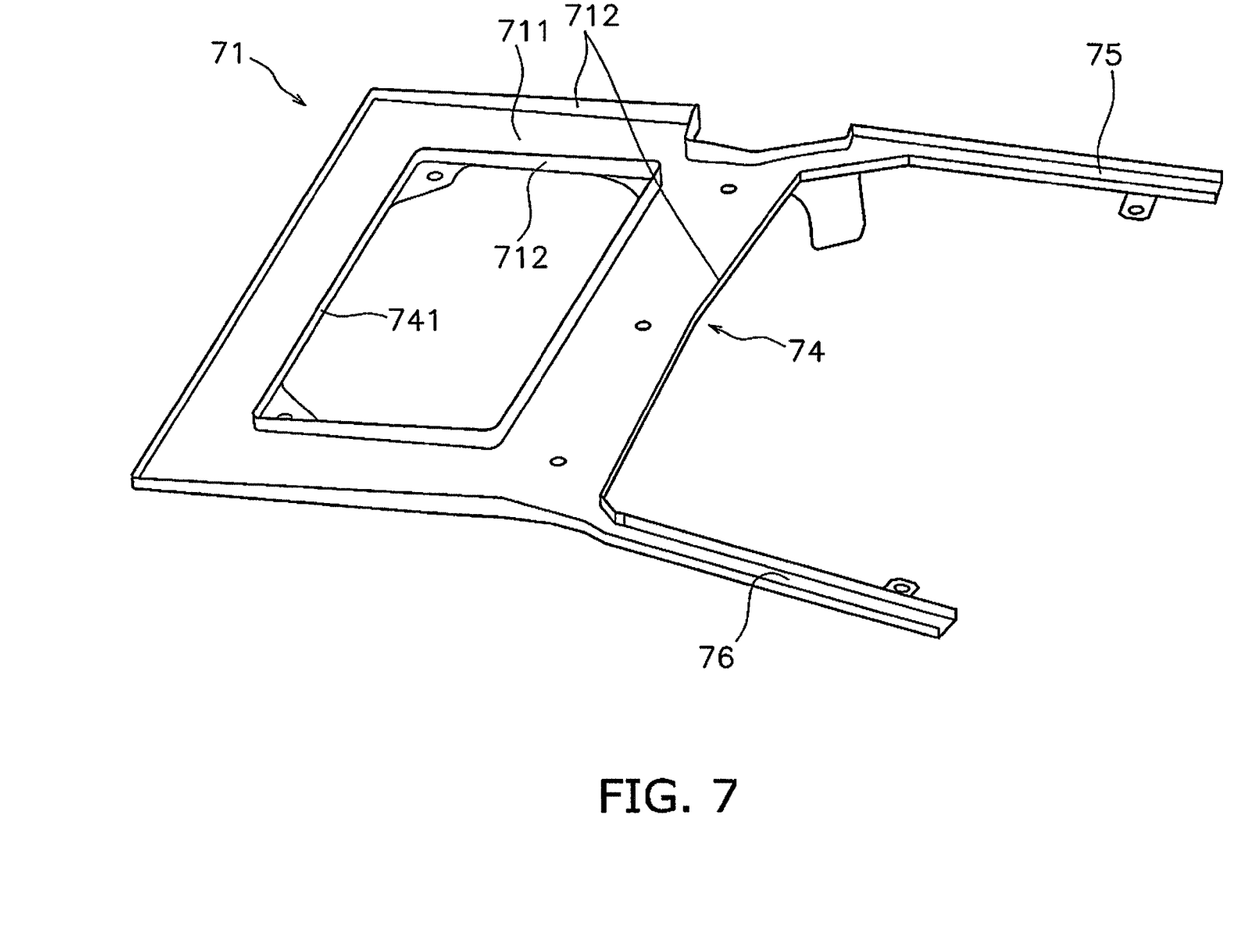
FIG. 7 is a perspective view of a water receiving member.

FIG. 7 is a perspective view of the water receiving member 71. As shown in FIG. 7, the water receiving member 71 includes a bottom plate 711 and vertical walls 712. The vertical walls 712 rise from the bottom plate 711 and are provided along the edges of the bottom plate 711. Accordingly, water received by the bottom plate 711 can be inhibited from flowing down from the water receiving member 71.

The water receiving member 71 includes a body 74 and connection pathways 75 and 76. The body 74 is disposed under the flat part 53. The body 74 is disposed under the first ventilation portions 49. The body 74 includes an opening 741. The opening 741 is located under the aforementioned first opening 48 of the first top surface 46. The aforementioned vertical walls 712 are also provided on the edges of the opening 741. As shown in FIG. 6, in the top view, parts of the body 74, disposed in the surroundings of the opening 741, overlap with the first ventilation portions 49. The body 74 tilts down toward the connection pathways 75 and 76. Therefore, water received by the body 74 can efficiently flow toward the connection pathways 75 and 76.

The connection pathways 75 and 76 include a first connection pathway 75 and a second connection pathway 76. The first and second connection pathways 75 and 76 extend from the body 74 toward the cooling compartment 24. The first and second connection pathways 75 and 76 are disposed away from each other without overlapping with the space produced under the aforementioned second opening 51. Therefore, in performing a work, such as maintenance of the first processing device 32 by removing the first cover member 52 for closing the second opening 51, the water receiving member 71 can be inhibited from hindering the work. The first and second connection pathways 75 and 76 tilt down toward the cooling compartment 24. Accordingly, water can efficiently flow to the first water catchment member 72 through the first and second connection pathways 75 and 76. It should be noted that each of the first and second connection pathways 75 and 76 tilts at a larger angle than the body 74 with respect to the horizontal direction.

As shown in FIG. 5, the first water catchment member 72 is disposed higher than the division wall 28. As shown in FIG. 6, the first water catchment member 72 extends in the vehicle width direction. The first water catchment member 72 is disposed to reach both the tip of the first connection pathway 75 and the tip of the second connection pathway 76. The tip of the first connection pathway 75 is the cooling compartment 24 side end of the first connection pathway 75. The tip of the second connection pathway 76 is the cooling compartment 24 side end of the second connection pathway 76.

Figure 8A:
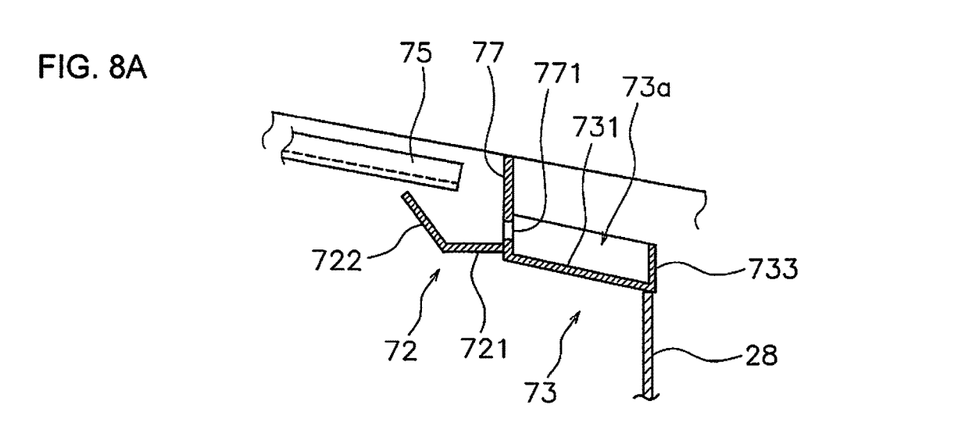
FIGS. 8A and 8B include cross-sectional side views of a first water catchment member and a second water catchment member.

FIG. 8A is a cross-sectional view taken along line A-A in FIG. 6. The first water catchment member 72 is disposed under the tip of the first connection pathway 75. Likewise, the first water catchment member 72 is disposed under the tip of the second connection pathway 76. The first water catchment member 72 receives water flowing down from the tip of the first connection pathway 75 and that of the second connection pathway 76. Water flowing down from the first connection pathway 75 and that flowing down from the second connection pathway 76 join in the first water catchment member 72.

The first water catchment member 72 includes a bottom plate 721 and a vertical wall 722. The bottom plate 721 is located under the tip of the first connection pathway 75 and that of the second connection pathway 76. The vertical wall 722 rises from the bottom plate 721, and is provided along the engine compartment 23 side edge of the bottom plate 721. Accordingly, water received by the first water catchment member 72 can be inhibited from flowing down into the engine compartment 23.

A partition member 77 is provided between the first water catchment member 72 and the second water catchment member 73. The partition member 77 divides between the first water catchment member 72 and the second water catchment member 73. The partition member 77 is disposed between the first top surface 46 and the second top surface 47. The partition member 77 is disposed between the engine compartment 23 and the cooling compartment 24. The partition member 77 divides between the engine compartment 23 and the cooling compartment 24 in a higher position than the division wall 28. The partition member 77 rises from the bottom plate 721 of the first water catchment member 72. The partition member 77 extends in the vehicle width direction.

As shown in FIG. 4, the partition member 77 includes a plurality of holes 771. As shown in FIG. 8(A), the holes 771 make the space within the first water catchment member 72 and that within the second water catchment member 73 communicate with each other. In other words, the holes 771 make the interior of the engine compartment 23 and that of the cooling compartment 24 communicate with each other. The holes 771 are disposed at intervals in the vehicle width direction. Water, flowing from the water receiving member 71, flows to the second water catchment member 73 through the first water catchment member 72 and then the holes 771 of the partition member 77. With the plural holes 771 bored in the partition member 77, hot air within the engine compartment 23 can be inhibited from massively flowing into the cooling compartment 24, and simultaneously, the water flowing from the water receiving member 71 can be transferred to the cooling compartment 24.

As shown in FIG. 4, the second water catchment member 73 is disposed under the third opening 61. The second water catchment member 73 is disposed higher than the division wall 28. Similarly to the first water catchment member 72, the second water catchment member 73 extends in the vehicle width direction. The second water catchment member 73 protrudes from the division wall 28 toward the cooling compartment 24.

The second water catchment member 73 includes a bottom plate 731 and a vertical wall 732. The vertical wall 732 extends from the partition member 77 toward the cooling compartment 24. The vertical wall 732 rises from the cooling compartment 24 side edge of the bottom plate 731. Accordingly, water can be inhibited from flowing down from the second water catchment member 73.

As shown in FIG. 6, the second water catchment member 73 includes a first water catchment part 73a and a second water catchment part 73b. The first water catchment part 73a is faced to the partition member 77. The first water catchment part 73a extends along the partition member 77. The second water catchment part 73b protrudes from the first water catchment part 73a toward the cooling compartment 24. The width of the second water catchment part 73b is smaller than that of the first water catchment part 73a.

The first water catchment part 73a includes a first vertical wall 733 and a second vertical wall 734. The first and second vertical walls 733 and 734 rise from the cooling compartment 24 side edge of the bottom plate of the first water catchment part 73a. The second water catchment part 73b protrudes from between the first and second vertical walls 733 and 734. The bottom plate of the second water catchment part 73b has a water catchment hole 735. The water catchment hole 735 penetrates the bottom plate of the second water catchment part 73b in the up-and-down direction.

The second water catchment part 73b includes a taper wall 736 and a third vertical wall 737. In a top view, the taper wall 736 tilts toward the water catchment hole 735. When described in detail, the taper wall 736 tilts such that the width of the second water catchment part 73b reduces in a direction from the engine compartment 23 to the cooling compartment 24. One end of the taper wall 736 is connected to the first vertical wall 733. The third vertical wall 737 connects the other end of the taper wall 736 and the second vertical wall 734.

Figure 8B:
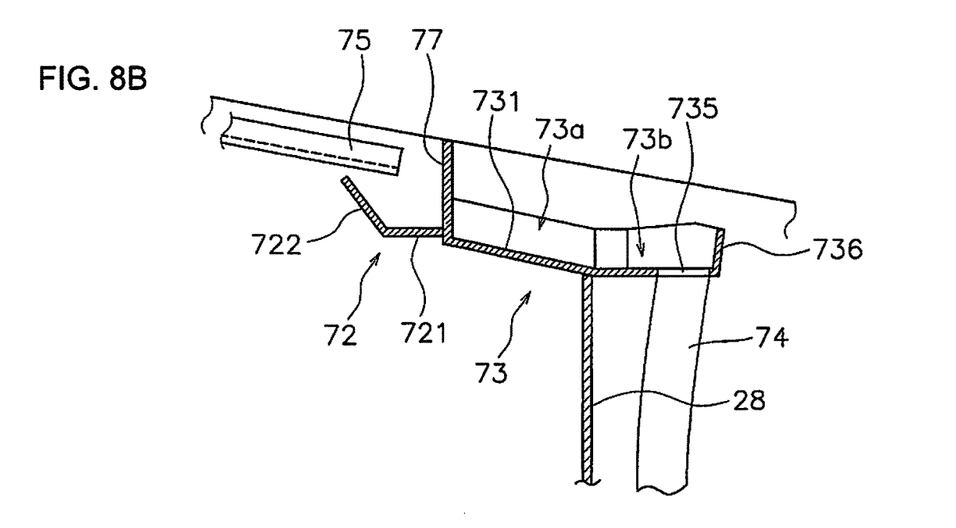

FIG. 8B is a cross-sectional view taken along line B-B in FIG. 6. As shown in FIG. 8B, the drainage pathway 74 is connected to the water catchment hole 735. The drainage pathway 74 is, for instance, a hose. It should be noted that the drainage pathway 74 is not limited to the hose and may be another member. For example, the drainage pathway 74 may be a pipe. Alternatively, the drainage pathway 74 may be a pathway made of sheet metal.

The drainage pathway 74 downwardly extends from the second water catchment member 73 within the cooling compartment 24. When described in detail, the drainage pathway 74 downwardly extends from the bottom plate of the second water catchment part 73b. The drainage pathway 74 downwardly extends along the division wall 28.

As shown in FIG. 2, the drainage pathway 74 extends to a predetermined drainage position P1 through the cooling compartment 24. The predetermined drainage position P1 is a position located lower than the engine 26. The predetermined drainage position P1 is a position located lower than the engine auxiliary machine 36. When described in detail, the predetermined drainage position P1 is a position located lower than the vehicle body frame 21. In other words, the tip of the drainage pathway 74 is located lower than the vehicle body frame 21. It should be noted that the drainage pathway 74 extends below the lower end of the division wall 28 while extending laterally to the protection member 28, and reaches a position located forward of the division wall 28.

In the work vehicle 1 according to the present exemplary embodiment, water received by the water receiving member 71 is caught in the first water catchment member 72, and is then caught in the second water catchment member 73 through the holes 771 of the partition member 77. The water caught in the second water catchment member 73 is led from the first water catchment part 73a to the second water catchment part 73b, and then flows down to the drainage pathway 74 through the water catchment hole 735 of the second water catchment part 73b. The water flows through the drainage pathway 74 and is then discharged to the outside from the tip of the drainage pathway 74 located lower than the vehicle body frame 21.

As described above, the water received by the water receiving member 71 is led from the first and second water catchment members 72 and 73 to the predetermined drainage position P1 through the drainage pathway 74. Therefore, even when a large amount of water is received by the water receiving member 71 in the engine compartment 23, the machines disposed in the engine compartment 23 can be inhibited from being exposed to the water.

One exemplary embodiment of the present invention has been described above. However, the present invention is not limited to the aforementioned exemplary embodiment, and a variety of changes can be made without departing from the scope of the present invention.

The work vehicle 1 is not limited to the wheel loader, and may be another type of vehicle, such as a hydraulic excavator. The construction of the water receiving member 71 may be changed. For example, the shape of the water receiving member 71 may be changed in accordance with positional arrangement of the opening or the ventilation portions with which the first top surface 46 is provided. The construction of the first water catchment member 72 and that of the second water catchment member 73 may be changed. For example, the position of the taper wall 736 of the second water catchment member 73 may be changed. Alternatively, the taper wall 736 may not be provided. The position of the water catchment hole 735 may be changed.

Figure 9:
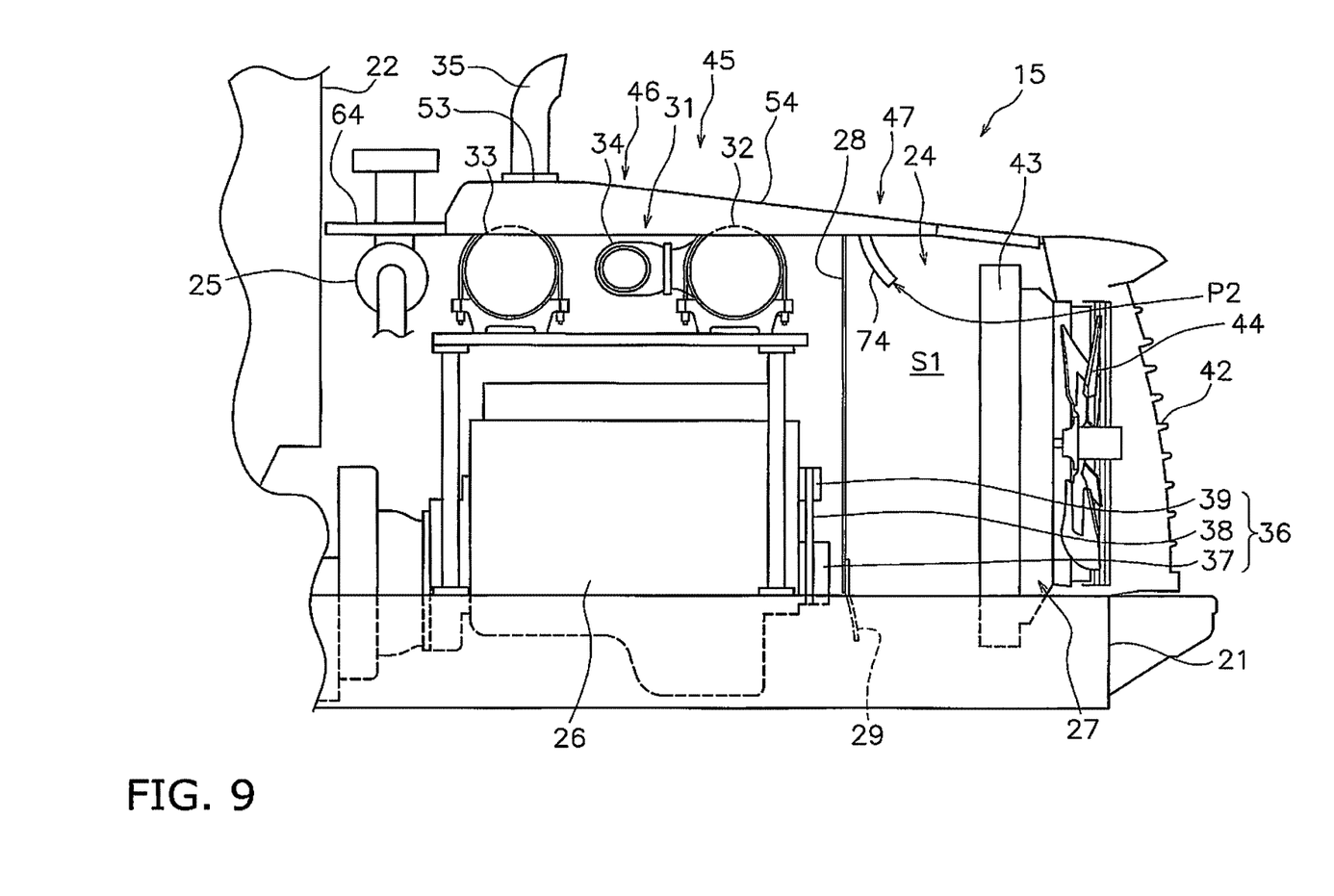
FIG. 9 is a cross-sectional side view of a rear body according to another exemplary embodiment.

In the aforementioned exemplary embodiment, the predetermined drainage position P1 is located lower than the engine 26. However, the predetermined drainage position P1 may be changed. For example, as shown in FIG. 9, a predetermined drainage position P2 may be located within the cooling compartment 24. The predetermined drainage position P2 is a position located away from the division wall 28 in a direction opposite to the engine compartment 23 within the cooling compartment 24. In other words, the predetermined drainage position P2 is a position located away from the division wall 28 in a direction opposite to the engine auxiliary machine 36 within the cooling compartment 24. The predetermined drainage position P2 is located higher than the vehicle body frame 21. The predetermined drainage position P2 is located higher than the lower end of the division wall 28. In the construction, the tip of the drainage pathway 74 is preferably directed to be opposite to the division wall 28. Even in this construction, similarly to the aforementioned exemplary embodiment, the engine 26 or the engine auxiliary machine 36 can be inhibited from being exposed to water.

According to exemplary embodiments of the present invention, it is possible to provide a work vehicle whereby even when a large amount of water is received by a water receiving member disposed in an engine compartment, machines disposed in the engine compartment can be inhibited from being exposed to the water.

The invention claimed is:

1. A work vehicle, comprising:
an engine;
an engine compartment accommodating the engine;
a cooling device configured to cool the engine;
a cooling compartment accommodating the cooling device;
a division wall disposed between the engine compartment and the cooling compartment;
a ventilation portion provided on a top surface of the engine compartment, the ventilation portion including a hole for permitting air to pass therethrough;
a water receiving member disposed under the ventilation portion within the engine compartment;
a water catchment member disposed in the cooling compartment to catch water received by the water receiving member; and
a drainage pathway connected to the water catchment member to lead the water to a predetermined drainage position.

2. The work vehicle according to claim 1, wherein
the water catchment member includes a bottom plate and a vertical wall rising from a cooling compartment side edge of the bottom plate.

3. The work vehicle according to claim 2, wherein
the bottom plate includes a water catchment hole, and the drainage pathway is connected to the water catchment hole.

4. The work vehicle according to claim 3, wherein
the vertical wall includes a taper wall tilting toward the water catchment hole in a vehicle top view.

5. The work vehicle according to claim 2, further comprising
a partition plate disposed between the engine compartment and the cooling compartment, the partition plate upwardly extending from the bottom plate,
the partition plate including a hole for permitting water to pass therethrough when the water flows from the water receiving member to the water catchment member.

6. The work vehicle according to claim 1, wherein
the drainage pathway downwardly extends from the water catchment member within the cooling compartment.

7. The work vehicle according to claim 6, wherein
the predetermined drainage position is located lower than the engine, and
the drainage pathway extends from the water catchment member to the predetermined drainage position through the cooling compartment.

8. The work vehicle according to claim 6, wherein
the predetermined drainage position is located away from the division wall in a direction opposite to the engine compartment within the cooling compartment, and
the drainage pathway extends from the water catchment member to the predetermined drainage position within the cooling compartment.

9. The work vehicle according to claim 6, further comprising
an engine auxiliary machine disposed in the engine compartment, the engine auxiliary machine being located lower than a lower end of the division wall,
the predetermined drainage position being located lower than the engine auxiliary machine, and
the drainage pathway extending from the water catchment member to the predetermined drainage position through the cooling compartment.

10. The work vehicle according to claim 6, further comprising
an engine auxiliary machine disposed in the engine compartment, the engine auxiliary machine being located lower than a lower end of the division wall,
the predetermined drainage position being located away from the division pall in a direction opposite to the engine auxiliary machine within the cooling compartment, and
the drainage pathway extending from the water catchment member to the predetermined drainage position within the cooling compartment.

11. The work vehicle according to claim 4, further comprising
a partition plate disposed between the engine compartment and the cooling compartment, the partition plate upwardly extending from the bottom plate,
the partition plate including a hole for permitting water to pass therethrough when the water flows from the water receiving member to the water catchment member.

12. The work vehicle according to claim 11, wherein
the drainage pathway downwardly extends from the water catchment member within the cooling compartment.

13. The work vehicle according to claim 12, wherein
the predetermined drainage position is located lower than the engine, and
the drainage pathway extends from the water catchment member to the predetermined drainage position through the cooling compartment.

14. The work vehicle according to claim 12, wherein
the predetermined drainage position is located away from the division wall in a direction opposite to the engine compartment within the cooling compartment, and
the drainage pathway extends from the water catchment member to the predetermined drainage position within the cooling compartment.

15. The work vehicle according to claim 12, further comprising
an engine auxiliary machine disposed in the engine compartment, the engine auxiliary machine being located lower than a lower end of the division wall,
the predetermined drainage position being located lower than the engine auxiliary machine, and
the drainage pathway extending from the water catchment member to the predetermined drainage position through the cooling compartment.

16. The work vehicle according to claim 12, further comprising
an engine auxiliary machine disposed in the engine compartment, the engine auxiliary machine being located lower than a lower end of the division wall,
the predetermined drainage position being located away from the division pall in a direction opposite to the engine auxiliary machine within the cooling compartment, and
the drainage pathway extending from the water catchment member to the predetermined drainage position within the cooling compartment.

* * * * *